(12) United States Patent
De Groot

(10) Patent No.: US 9,787,918 B2
(45) Date of Patent: Oct. 10, 2017

(54) ACQUIRING AND DISPLAYING IMAGES IN REAL-TIME

(75) Inventor: Arjan Willem De Groot, Groningen (NL)

(73) Assignee: PHOTONIS NETHERLANDS B.V., Roden (NL)

(*) Notice: Subject to any disclaimer, the term of this patent is extended or adjusted under 35 U.S.C. 154(b) by 757 days.

(21) Appl. No.: 13/984,950

(22) PCT Filed: Feb. 25, 2011

(86) PCT No.: PCT/EP2011/052853
§ 371 (c)(1),
(2), (4) Date: Aug. 12, 2013

(87) PCT Pub. No.: WO2012/133459
PCT Pub. Date: Aug. 30, 2012

(65) Prior Publication Data
US 2013/0314546 A1    Nov. 28, 2013

(51) Int. Cl.
*H04N 5/33* (2006.01)
*H04N 5/353* (2011.01)
(Continued)

(52) U.S. Cl.
CPC ....... *H04N 5/3532* (2013.01); *H04N 5/23293* (2013.01); *H04N 5/33* (2013.01);
(Continued)

(58) Field of Classification Search
CPC .... H04N 5/3532; H04N 5/33; H04N 5/23293; H04N 13/0296; H04N 13/0239; H04N 5/262; G02B 23/125
See application file for complete search history.

(56) References Cited

U.S. PATENT DOCUMENTS

| 4,797,751 A | 1/1989 | Yamaguchi |
| 5,929,905 A | 7/1999 | Kanda et al. |

(Continued)

FOREIGN PATENT DOCUMENTS

| CN | 101459829 | 6/2009 |
| EP | 1 906 657 | 4/2008 |

(Continued)

OTHER PUBLICATIONS

International Search Report for PCT/EP2011/052853 mailed Dec. 12, 2011.

(Continued)

*Primary Examiner* — Sath V Perungavoor
*Assistant Examiner* — Xiaolan Xu
(74) *Attorney, Agent, or Firm* — Nixon & Vanderhye P.C.

(57) ABSTRACT

An imaging device (100) for acquiring and displaying images in real-time, the imaging device comprising i) an imaging sensor (110) comprising a radiation sensitive array (120) for acquiring an image (142), ii) a readout circuit (140) connected to the radiation sensitive array for reading out the image, iii) a signal processor (160) for processing the image for obtaining a processed image (162), and iv) a display (180) for displaying the processed image, the radiation sensitive array being arranged in rows of sensor pixels and the display being arranged in rows of display pixels, and wherein the readout circuit is a rolling shutter circuit for sequentially reading out the rows of sensor pixels for sequentially providing subsets of pixels, the signal processor is configured for, on availability of one of the subsets of pixels, processing the subset of pixels for providing a processed subset of pixels, and the display is configured for, on availability of the processed subset of pixels, displaying the processed subset of pixels on a thereto corresponding (Continued)

subset of display pixels for displaying the processed image sequentially on the rows of display pixels.

12 Claims, 6 Drawing Sheets

(51) Int. Cl.
  H04N 5/232 (2006.01)
  H04N 13/02 (2006.01)
  G02B 23/12 (2006.01)
  H04N 5/262 (2006.01)
(52) U.S. Cl.
  CPC ..... *H04N 13/0239* (2013.01); *H04N 13/0296* (2013.01); *G02B 23/125* (2013.01); *H04N 5/262* (2013.01)

(56) References Cited

U.S. PATENT DOCUMENTS

| | | | |
|---|---|---|---|
| 6,560,029 B1 | 5/2003 | Dobbie et al. | |
| 7,121,036 B1 | 10/2006 | Florence et al. | |
| 7,428,378 B1* | 9/2008 | Warpakowski Furlan | G03B 7/16 348/370 |
| 2003/0222987 A1 | 12/2003 | Karazuba | |
| 2004/0196390 A1 | 10/2004 | Shimazu et al. | |
| 2005/0077450 A1* | 4/2005 | Baer | H01L 27/14643 250/208.1 |
| 2005/0140807 A1 | 6/2005 | Nam | |
| 2006/0139488 A1 | 6/2006 | Suzuki et al. | |
| 2006/0221180 A1* | 10/2006 | Ostromek | G02B 27/017 348/53 |
| 2006/0289772 A1* | 12/2006 | Johnson | G01C 3/08 250/370.08 |
| 2008/0084483 A1* | 4/2008 | Kusaka | H04N 5/23212 348/222.1 |
| 2008/0218627 A1* | 9/2008 | Suzuki | G03B 7/093 348/362 |
| 2009/0033760 A1 | 2/2009 | Oh et al. | |
| 2010/0026844 A1 | 2/2010 | Hopkins | |
| 2012/0133785 A1* | 5/2012 | Wasserbauer | G06T 3/4053 348/208.4 |

FOREIGN PATENT DOCUMENTS

| | | |
|---|---|---|
| JP | 9-247519 A | 9/1997 |
| JP | 2005-159596 A | 6/2005 |
| JP | 2008-537665 A | 9/2008 |
| JP | 2008252331 | 10/2008 |
| JP | 2010-134743 A | 6/2010 |
| JP | 2010-154171 A | 7/2010 |
| WO | WO 2006/110325 A2 | 10/2006 |

OTHER PUBLICATIONS

Written Opinion of the International Searching Authority mailed Dec. 12, 2011.
Avocet Image Sensor Data Sheet (summary), Melexis, Image Sensor Datasheet,, MLX75411-75412 (Avocet), 2010, 27 pages.

* cited by examiner

ACQUIRING AND DISPLAYING IMAGES IN REAL-TIME

This application is the U.S. national phase of International Application No. PCT/EP2011/052853 filed Feb. 25, 2011 which designated the U.S., the entire content of which is hereby incorporated by reference.

FIELD OF THE INVENTION

The invention relates to an imaging device for, and a method of acquiring and displaying images in real-time. The invention further relates to a helmet, a head mount, a rifle sight or a handheld device comprising the imaging device set forth.

Direct view systems are imaging devices in which images are acquired by an imaging component and then provided to a user in real-time by a display component. In such direct view systems, there may be a time difference between the acquisition of an image and the display of the image. This time difference is typically referred to as latency. Examples of direct view systems are night vision devices and telescopic viewing devices.

Latency is mostly undesirable, particularly when the direct view system is intended for portable use. A reason for this is that the user may be moving when using the direct view system. The latency may cause the user to perceive different motion through the display component than through the user's other senses of motion, e.g., the user's vestibular system. If the latency, and consequently the mismatch between the perceived and otherwise experienced motion is too high, the user may experience nausea or motion sickness.

Many direct view systems are predominantly optical or opto-electronical based. For example, a night vision device may comprise optics and an image intensifier tube as imaging component and a phosphor screen as display component. During operation, photons from a low light level scene are converted into photoelectrons, multiplied by the image intensifier tube and finally accelerated towards the phosphor screen for their conversion back into visible light. The latency of such a direct view system is typically a few milliseconds as defined by the decay of the phosphorous screen, which is sufficiently low to avoid the user experiencing motion sickness during portable use.

BACKGROUND OF THE INVENTION

It may be desirable to have a direct view system in which the image is intermediately available in digital form, i.e., being represented in a digital signal domain. This may allow the direct view system to employ digital signal processing to improve the image's quality, to overlay relevant information onto the image, etc. Such a direct view system may use a semiconductor sensor for acquiring an image, a signal processor for processing the image and an electronic display for displaying the image.

SUMMARY OF THE INVENTION

The overall latency of such a digital signal domain based direct view system may be relatively high. Disadvantageously, a user may experience motion sickness during portable use of such a direct view system.

It is an object of the invention to provide an imaging device for, and a method of acquiring and displaying images in real-time with a reduced latency, with the image being intermediately available in digital form for allowing signal processing.

According to the invention, this object is realized in that imaging device is provided for acquiring and displaying images in real-time, the imaging device comprising i) an imaging sensor comprising a radiation sensitive array for acquiring an image, ii) a readout circuit connected to the radiation sensitive array for reading out the image, iii) a signal processor for processing the image for obtaining a processed image, and iv) a display for displaying the processed image, the radiation sensitive array being arranged in rows of sensor pixels and the display being arranged in rows of display pixels, and wherein the readout circuit is a rolling shutter circuit for sequentially reading out the rows of sensor pixels for sequentially providing subsets of pixels, the signal processor is configured for, on availability of one of the subsets of pixels, processing the subset of pixels for providing a processed subset of pixels, and the display is configured for, on availability of the processed subset of pixels, displaying the processed subset of pixels on a thereto corresponding subset of display pixels for displaying the processed image sequentially on the rows of display pixels.

In a further aspect of the invention, a helmet, head mount, rifle sight or handheld device is provided comprising the imaging device set forth.

In a further aspect of the invention, a method is provided of acquiring and displaying images in real-time with an imaging device, the imaging device comprising i) an imaging sensor comprising a radiation sensitive array for acquiring an image, ii) a readout circuit connected to the radiation sensitive array for reading out the image, iii) a signal processor for processing the image for obtaining a processed image, and iv) a display for displaying the processed image, the radiation sensitive array being arranged in rows of sensor pixels and the display being arranged in rows of display pixels, and wherein the method comprises sequentially reading out the rows of sensor pixels with the readout circuit for sequentially providing subsets of pixels, on availability of one of the subsets of pixels, processing the subset of pixels with the signal processor for providing a processed subset of pixels, and on availability of the processed subset of pixels, displaying the processed subset of pixels with the display on a thereto corresponding subset of display pixels for displaying the processed image sequentially on the rows of display pixels.

In a further aspect of the invention, a computer program is provided that is stored on a computer-readable medium, the computer program comprising instructions for causing a processor system to perform the method set forth.

The measures according to the invention provide an imaging device for acquiring and displaying images in real-time, i.e., a direct view system, and a method of operating the imaging device. Here, real-time refers to a user using the imaging device to view images of a scene that reflect the current scene as closely as possible in time. The imaging device comprises an imaging sensor, e.g., a semiconductor sensor such as a Complementary Metal-Oxide-Semiconductor (CMOS) sensor. The imaging sensor is used to convert radiation emitted or reflected from a scene into a digital representation of the scene, i.e., an image. For that purpose, the imaging sensor comprises a radiation sensitive array that is arranged in rows of sensor pixels. The imaging device further comprises a readout circuit, i.e., a circuitry that reads out the image from the radiation sensitive array by addressing and subsequently reading out the image from the rows of sensor pixels. The imaging device further comprises a signal processor that is configured for processing the image acquired from the imaging sensor using digital signal processing. As a result, a processed image is provided, that is then displayed on a display. The display is arranged in rows of display pixels. As such, the rows of display pixels are used to display the image that is acquired by the corresponding rows of sensor pixels of the radiation sensitive array.

The imaging device is configured for reducing a latency between the image being acquired and the processed image being displayed. For that purpose, the readout circuit is a rolling shutter circuit. Rolling shutter is also known as line scan, and refers to a manner of reading out of the radiation sensitive array in which the rows of sensor pixels are read out sequentially, i.e., one row after each other, or a subset of rows after each other. As a consequence, the rows or subset of rows that have been read out correspond to different points in time. As a result of the reading out of the rows of sensor pixels, the rolling shutter circuit sequentially provides subsets of pixels to the signal processor. In turn, the signal processor, upon receiving a subset of pixels, processes the subset of pixels, and then provides a result of the processing, i.e., a processed subset of pixels, to the display. Each processed subset of pixels is then displayed by the display on a thereto corresponding subset of display pixels. Thus, the rows of sensor pixels are sequentially read out to provide a sequence of subsets of pixels, with a subset of pixels being processed after receipt by the signal processor and being displayed after receipt by the display.

It will be appreciated that the invention refers to reading, processing and displaying of rows of pixels. A reason for this is that sensors and displays are commonly read-out or written-to in a row-based manner. However, it will be appreciated that the present invention is equally applicable to the reading, processing and displaying of columns of pixels, e.g., a reading circuit may be arranged for sequentially reading out columns of sensor pixels.

The invention is partially based on the recognition that in traditional direct view systems, a so-termed snapshot mode is used for reading out the image from the radiation sensitive array. Here, the entire image is first read out and stored in a frame buffer memory, and only when the entire image has been stored, the image is processed and subsequently displayed in its entirety. Disadvantageously, the latency introduced by storing the image in a frame buffer before or during the processing may cause a user to experience motion sickness during portable use of the direct view system.

The effect of the aforementioned measures is that the imaging device is configured for displaying a subset of pixels on a subset of display pixels as soon as possible after the corresponding subset of sensor pixels has been read out. Thus, the imaging device is configured for directly providing each portion of the image that has been read out, i.e., each subset of pixels, to the signal processor and subsequently each processed portion to the display. As a result, the overall latency of the imaging device is reduced. Advantageously, the latency of the imaging device is sufficiently reduced for avoiding a user experiencing motion sickness during portable use of the imaging device.

Optionally, the imaging device comprises a further imaging sensor and a further readout circuit, the further imaging sensor comprising a further radiation sensitive array for acquiring a further image, the further readout circuit being connected to the further radiation sensitive array for reading out the further image, the further radiation sensitive array being arranged in rows of further sensor pixels, the further readout circuit being a further rolling shutter circuit for sequentially reading out the rows of further sensor pixels for sequentially providing further subsets of pixels, and wherein the imaging device is configured for synchronously displaying the image and the further image on the display by the rolling shutter circuit and the further rolling shutter circuit being configured for synchronously providing the subset of pixels and one of the further subsets of pixels by substantially synchronously reading out corresponding portions of the image and the further image, and the signal processor being configured for, on availability of the subset of pixels and the further subset of pixels, combining the subset of pixels with the further subset of pixels for obtaining the processed subset of pixels.

The imaging device is configured for synchronously displaying the image and a further image on the display. For acquiring the further image, the imaging device comprises a further imaging sensor. In order to synchronously provide corresponding portions of both images to the signal processor for processing and subsequent display, the rolling shutter circuit and the further rolling shutter circuit are configured for substantially synchronously reading out the corresponding portions of the image and the further image. As a result, the subset of pixels and the further subset of pixels are provided synchronously.

The effect of the aforementioned measures is that the imaging device is configured for acquiring and displaying two images simultaneously while at the same time also reducing the latency between said acquiring and displaying. Advantageously, fewer buffer memories are needed in the imaging device, as there is less or no need for compensating for a mismatch in a timing of portions of the image and portions of the further image becoming available for subsequent processing and display. Consequently, the cost and/or the complexity of the imaging device is reduced.

Optionally, the imaging sensor is a visible light imaging sensor for sensing visible light and the further imaging sensor is a thermal imaging sensor for sensing infrared radiation for enabling synchronously displaying a visible light image and a thermal image on the display. Advantageously, the imaging device simultaneously acquires and displays the visible light and the thermal radiation of a scene while providing a reduced latency.

Optionally, the signal processor is configured for combining the subset of pixels with the further subset of pixels by fusing the subset of pixels with the further subset of pixels for obtaining as the processed image an image fusion of the image with the further image. Image fusion offers an intuitive way of combining two images, and in particular, two related images of a same scene. Advantageously, the thermal radiation of a scene may be visualized as colours overlaid over the visible light of a scene for offering an intuitive way of displaying visible light and thermal radiation of a scene to a user.

Optionally, the radiation sensitive array has a first spatial resolution, the further radiation sensitive array has a second spatial resolution, the second spatial resolution being lower than the first spatial resolution and the further rolling shutter circuit being configured for reading out the further image with a second readout speed that is lower than a first readout speed of the rolling shutter circuit for enabling said synchronously providing the subset of pixels and the further subset of pixels.

The further rolling shutter circuit thus uses a lower readout speed to ensure the synchronously providing of the corresponding portions of the image and the further image to the signal processor. Adapting the readout speed is an efficient way of compensating for said difference in spatial resolutions, as, e.g., a same readout speed would typically require frequent intermediate pausing of the reading out to ensure the aforementioned synchronicity. Advantageously, a lower readout speed results in a lower power consumption of the further rolling shutter circuit, and consequently, of the imaging device.

Optionally, the rolling shutter circuit is configured for reading out the image with the first readout speed within an imaging frame time, and the further rolling shutter circuit is configured for reading out the further image with the second readout speed within the imaging frame time. The readout speeds are thus adapted to read the image and the further image within the same imaging frame time. As a consequence, a ratio of the first readout speed to the second readout speed equals the ratio of the first spatial resolution and the second spatial resolution. Advantageously, no intermediate pausing of the reading out is needed to ensure the aforementioned synchronicity.

Optionally, the rolling shutter circuit is clocked at a first pixel clock for providing the first readout speed and the further rolling shutter circuit is clocked at a second pixel clock for providing the second readout speed. The pixel clock of each rolling shutter circuit is thus adapted to the needed readout speed. Advantageously, the lower pixel clock of the further rolling shutter circuit results in a lower power consumption.

Optionally, the imaging device comprises a scaler for spatially scaling the further subset of pixels for providing as the further image a scaled image having the first spatial resolution. A scaler provides an efficient way of adjusting the spatial resolution of the further image to the spatial resolution of the image. Advantageously, the further rolling shutter circuit may not need to compensate for the difference in spatial resolution by providing the further subset of pixels to a buffer, and the signal processor repeatedly reading the same further subset of pixels from the buffer. Advantageously, the further image is displayed with a better image quality, and in particular, with a better spatial definition of edges. Advantageously, the further image may be overlaid on the image, with overlaid portions of both images being associated with a same portion of a scene.

Optionally, the scaler is configured for performing the spatial scaling using at least one technique out of the group of: pixel repetition, first order linear interpolation, higher order linear interpolation and non-linear interpolation techniques. The aforementioned interpolation techniques are particularly well-suited for spatial scaling.

Optionally, the signal processor comprises an image processing pipeline for obtaining a pipelined processing of the subsets of pixels. Performing the image processing in a pipelined manner, as is known from the technical field of processor design and architecture, provides a processing higher throughput. Advantageously, the signal processor can accept new subsets of pixels, or individual pixels of the new subset of pixels, in each clock cycle. Advantageously, less buffering is needed to cope with the signal processor being unable to accept new pixels due to being occupied with processing of previous pixels.

Optionally, the rolling shutter circuit is configured for reading out the image with a first readout speed, and wherein the imaging device is configured for establishing the first readout speed in dependence on an amount of radiation impinging on the radiation sensitive array. By establishing the first readout speed in dependence on an amount of radiation impinging on the radiation sensitive device, a trade-off can be established between a needed exposure time of the radiation sensitive array, and a difference in acquisition between a top portion of the image and a bottom portion, which results in so-termed skew effects. Advantageously, the first readout speed can be increased if sufficient radiation is impinging on the radiation sensitive array, thereby reducing said skew effects.

Optionally, the imaging device comprises an image intensifier for providing intensified visible light to the imaging sensor. By using an image intensifier, the imaging sensor is able to acquire an image in low light conditions with an improved signal-to-noise ratio. An imaging device comprising an image intensifier is typically also known as a night vision device or low light level image intensifier.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
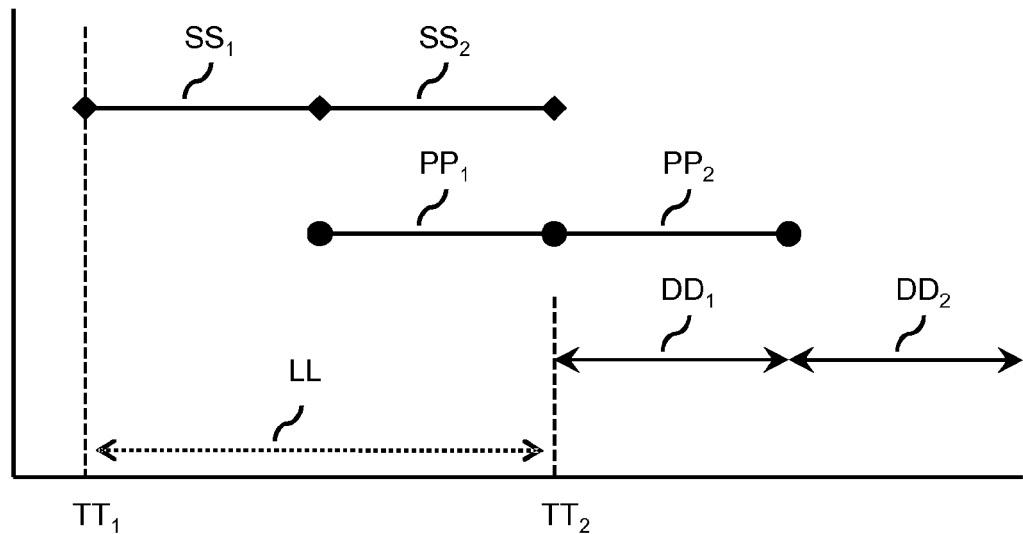
FIG. 1 shows a timing diagram of a direct view system.

FIG. 1 shows a timing diagram of a direct view system comprising a frame buffer memory. Here, the horizontal axis is indicative of time, whereas the vertical axis is used for visually differentiating between timings of a reading of an image, a processing of the image and a displaying of the image. Here, $SS_1$ indicates a time period for reading an image from an imaging sensor. The reading $SS_1$ comprises storing the read image in a frame buffer memory. In such a direct view system, processing takes only place when the image is entirely stored in the frame buffer memory. Thus, after the reading $SS_1$ has completed, the direct view system commences processing $PP_1$ the image. Typically, portions of the image are read out from the frame buffer memory, processed, and then written back to the frame buffer memory or to a further frame buffer memory. Finally, after the processing $PP_1$ has completed, the direct view system commences displaying $DD_1$ the image. Consequently, a time period between a start $TT_1$ of the reading $SS_1$ of the image and a start $TT_2$ of the displaying $DD_1$ of the image indicates a minimum delay, or latency LL, that a user experiences between an change in a scene and the displayed image reflecting said change.

For increasing a throughput of the direct view system, the reading, processing and displaying may be pipelined. This means that while the processing $PP_1$ of the image takes place, a reading $SS_2$ of a following image may take place. Similarly, while the displaying $DD_1$ of the image takes place, a processing PP2 of the following image may take place, etc. It is noted that such pipelining increases a throughput of the direct view system, i.e., allows a system to read, process and display more images in a given time period. However, said pipelining does not affect the latency LL of the direct view system.

Figure 2:
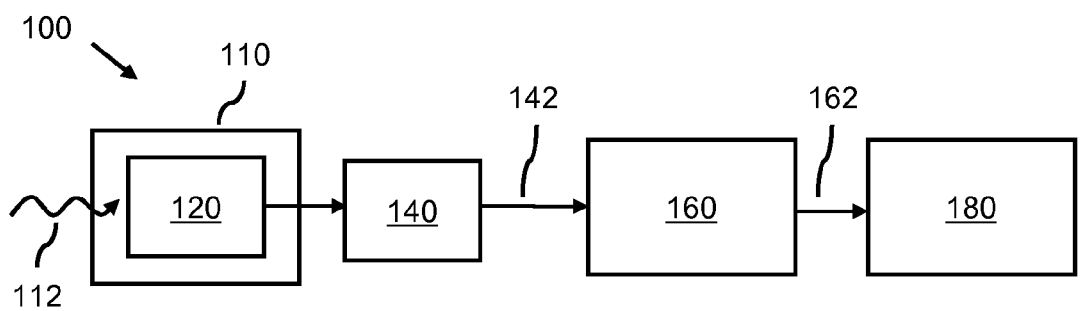
FIG. 2 shows an imaging device comprising an imaging sensor.

FIG. 2 shows an imaging device 100 for acquiring and displaying images in real-time. The imaging device 100 comprises an imaging sensor 110, and the imaging sensor 110 comprises a radiation sensitive array 120 for acquiring an image 142. The imaging device 100 further comprises a readout circuit 140 connected to the radiation sensitive array 120 for reading out the image 142, and a signal processor 160 for processing the image 142 for obtaining a processed image 162. For that purpose, the readout circuit 140 is shown to be connected to the signal processor 160. The imaging device 100 further comprises a display 180 for finally displaying the processed image 162 on the display 180.

Figure 3:
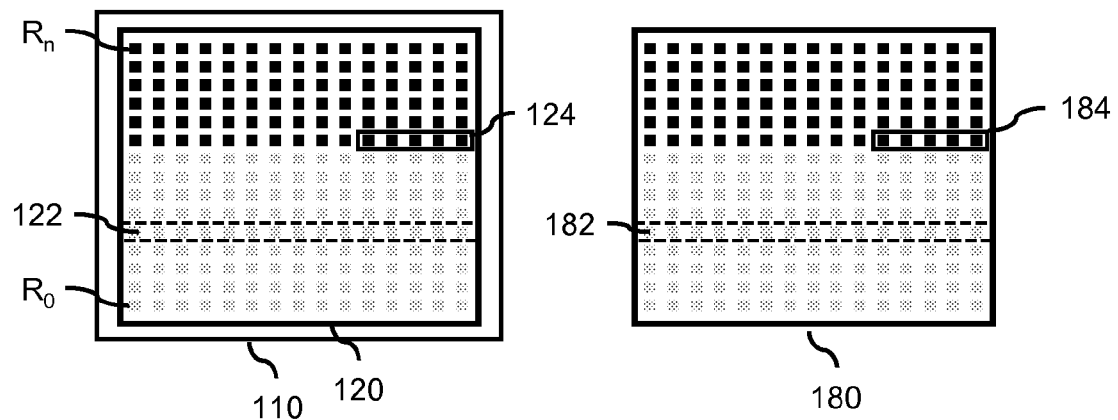
FIG. 3 shows the imaging sensor and a display.

FIG. 3 shows the imaging sensor 110 comprising the radiation sensitive array 120. Also shown is that the radiation sensitive array 120 is arranged in rows of sensor pixels 122. It is noted that, although not explicitly indicated in FIG. 3, the radiation sensitive array 120 is also arranged in columns of sensor pixels as a consequence of being an array. Also shown in FIG. 3 is the display 180 as a display pixel array which is arranged in rows of display pixels 182. It is noted that, although not explicitly indicated in FIG. 3, the display 180 is also arranged in columns of display pixels as a consequence of being an array.

Figure 4:
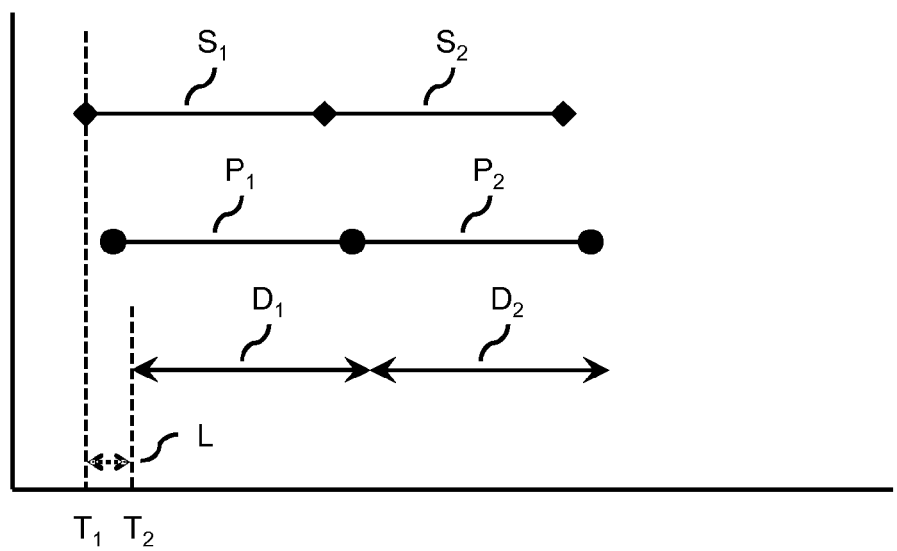
FIG. 4 shows a timing diagram of the imaging device.
Figure 5:
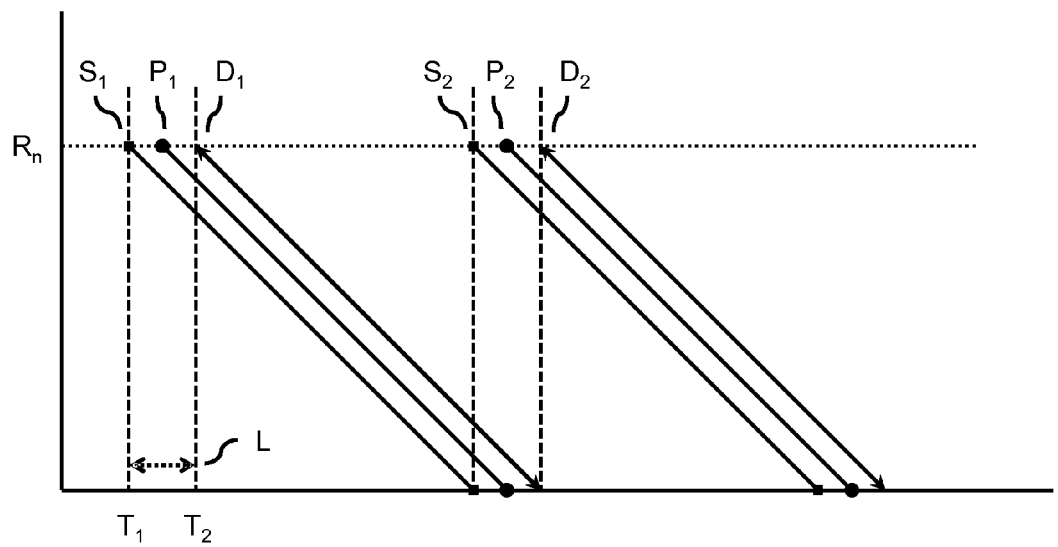
FIG. 5 shows an alternate representation of the timing diagram of FIG. 4.

During operation of the imaging device 100, the readout circuit 140 sequentially reads out the rows of sensor pixels 122 for sequentially providing a subset of pixels 124. This reading is indicated in the timing diagrams shown in FIGS. 4 and 5. Here, $S_1$ indicates a time period for reading the image 142 from the imaging sensor 110. FIG. 4 shows the time period in a similar manner as FIG. 1 for allowing a comparison with the aforementioned direct view system. In FIG. 5, the horizontal axis is indicative of time, whereas the vertical axis is indicative of a row number, with $R_n$ indicating a top row of the radiation sensitive array 120 and $R_0$ indicating a bottom row. Thus, FIG. 5 shows the readout circuit 140 reading out the row $R_n$ at the beginning of the time period $S_1$ and the row $R_0$ at its end. Consequently, during the reading $S_1$, all rows $R_n$ to $R_0$ are read out sequentially.

The above described reading $S_1$ of the radiation sensitive array 120 is achieved by the readout circuit 140 being a rolling shutter circuit. The rolling shutter circuit 140 differs from a circuit configured for reading out the radiation sensitive array 120 using a snapshot shutter. The basic operating principle of a rolling shutter circuit is that the radiation sensitive array 120 is addressed in a row-by-row, i.e., on a line-by-line basis for i) initializing an exposure of a row and ii) reading out its contents after said exposure. This is typically achieved by the use of two pointers, each addressing respective rows in the radiation sensitive array 120. One pointer provides a reset of a currently addressed row for initializing an exposure of the row, whereas the other pointer addresses a row that is to be read out. The difference in location between the two pointers is the effective exposure time, i.e., if the 'reset' pointer trails the 'readout' pointer by only one row, the exposure time is maximized.

In contrast, a circuit that uses a snapshot shutter typically exposes the entire radiation sensitive array simultaneously before reading out the entire image from the radiation sensitive array into a frame buffer memory. During the time needed for reading out the entire image, the radiation sensitive array is not configured for exposure anymore. Disadvantageously, the exposure time provided by said circuit is less than that of a rolling shutter circuit. A shorter exposure time typically results in an image that has a worse signal-to-noise ratio, i.e., is noisier. A publication "*EBAPS: Next Generation, Low Power, Digital Night Vision*", Aebi et al., Intevac Corporation, OPTRO 2005 symposium, Paris, France, describes using a rolling shutter circuit for maximizing the exposure time of a camera sensor.

The pointers of the rolling shutter circuit 140 may be increased by an internal state machine in the imaging sensor 110 itself, i.e., the rolling shutter circuit 140 may be part of the imaging sensor 110. External logic, e.g., a Field Programmable Gate Array (FPGA) located outside of the imaging sensor 110 may be used to clock the state machine and to program the distance between the two pointers for determining the exposure time.

By sequentially reading out the rows of sensor pixels 122, the rolling shutter circuit 140 sequentially provides a subset of pixels 124. The subset of pixels 124 may comprise the pixels of an entire row, or of a subset of rows. The subset of pixels may also comprise a subset of pixels from a single row, e.g., a single pixel or multiple neighbouring pixels. The rolling shutter circuit 140 provides the subset of pixels 124 to the signal processor 160, which, on availability of the subset of pixels 124, processes the subset of pixels to provide a processed subset of pixels. By processing the sequentially provided subset of pixels, the signal processor 160 effectively processes the image 142 and provides a processed image 162. This processing is indicated in the timing diagrams shown in FIGS. 4 and 5. Here, $P_1$ indicates a time period for processing the image 142. FIG. 5 shows the readout circuit 140 processing the row $R_n$ at the beginning of the time period $P_1$ and the row $R_0$ at its end. Consequently, during the processing $P_1$, all rows $R_n$ to $R_0$ are processed sequentially.

The time delay between the reading $S_1$ and the processing $P_1$, as shown in FIGS. 4 and 5, is dependent on, amongst others, a size of the subset of pixel 124. For example, if the subset of pixels 124 comprises the pixels of a row of sensor pixels 122, the processing $P_1$ is delayed with respect to the reading $S_1$ by at least a time period needed for reading and providing said subset of pixels 124 to the signal processor 160. It will be appreciated, however, that said time delay is significantly less than a time delay corresponding to an entire reading out of the image 142 due to the sequential providing of the subset of pixels 124.

On availability of the processed subset of pixels, the display 180 displays the processed subset of pixels on a thereto corresponding subset of display pixels 184. By displaying the sequentially provided processed subset of pixels, the display 180 effectively displays the processed image 162. This displaying is indicated in the timing diagrams shown in FIGS. 4 and 5. Here, $D_1$ indicates a time period for displaying the processed image 162. FIG. 5 shows the display 180 displaying the row $R_n$ at the beginning of the time period $D_1$ and the row $R_0$ at its end. It will be appreciated that for the time delay between the displaying $D_1$ and the processing $P_1$, similar considerations holds as for the time delay between the reading $S_1$ and the processing $P_1$. The imaging device shown in FIG. 2 thus provides a latency L that corresponds to a time delay between the reading $S_1$ and the displaying $D_1$. Moreover, it will be appreciated that a reading $S_2$ of a following image may commence after the reading $S_1$ of the image has finished. Similarly, a processing P$_2$ may commence after the processing P$_1$ has finished, and a displaying D$_2$ may commence after the displaying D$_1$ has finished.

Figure 6:
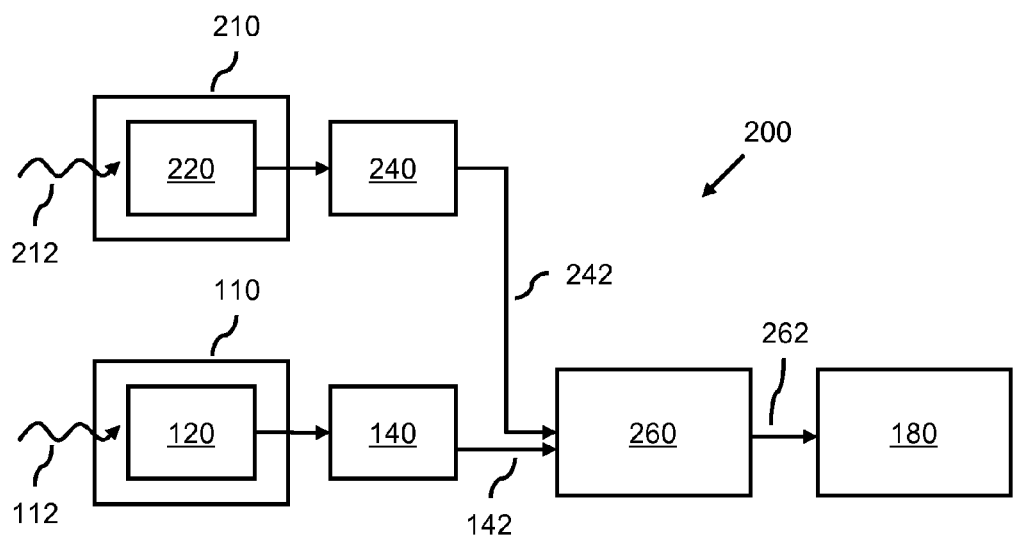
FIG. 6 shows an imaging device comprising a further imaging sensor.

FIG. 6 shows an imaging device 200. The imaging device comprises, next to the imaging sensor 110 and the readout circuit 140, also a further imaging sensor 210 and a further readout circuit 240. The further imaging sensor 210 comprises a further radiation sensitive array 220 for acquiring a further image 242. For reading out the further image 242, the further readout circuit 240 is connected to the further radiation sensitive array 220.

Figure 7:
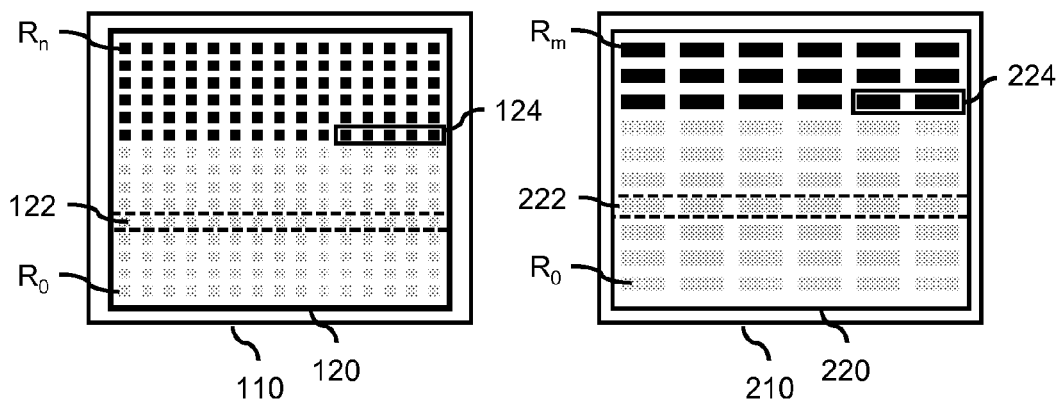
FIG. 7 shows an imaging sensor and the further imaging sensor.

FIG. 7 shows the further imaging sensor 210 comprising the further radiation sensitive array 220 next to the aforementioned imaging sensor 110 and radiation sensitive array 110. Also shown is that the further radiation sensitive array 220 is arranged in rows of further sensor pixels 222. It is noted that, although not explicitly indicated in FIG. 7, the further radiation sensitive array 220 is also arranged in columns of sensor pixels as a consequence of being an array. FIG. 7 also shows the radiation sensitive array 120 having a first spatial resolution, the further radiation sensitive array 220 having a second spatial resolution, with the second spatial resolution being lower than the first spatial resolution. As a consequence, the radiation sensitive array 120 is build up by n+1 rows, i.e., row R$_0$ to row R$_n$, whereas the radiation sensitive array 220 is build up by m+1 rows, i.e., row R$_0$ to row R$_m$, with m being smaller than n. This configuration is assumed in the remainder of the description of the imaging device of FIG. 6. However, it is noted that the second spatial resolution may also be equal to or larger than the first spatial resolution. Moreover, it is noted that spatial resolution may refer to an image's horizontal or vertical resolution, e.g., having 1280 pixels or 1024 lines, or to a combined resolution, e.g., a 1.3 megapixel image.

Referring to FIG. 6 again, the readout circuit 140 is configured as a further rolling shutter circuit for sequentially reading out the rows of further sensor pixels 222. During operation of the imaging device 200, the rolling shutter circuit 140 and the further rolling shutter circuit 240 synchronously provide the subset of pixels 124 and the further subset of pixels 224 by substantially synchronously reading out corresponding portions of the image 142 and the further image 242. Here, corresponding portions refer to portions of the image that have an associated image contents. For example, when the imaging sensor 110 is a visible light imaging sensor for sensing visible light 112 and the further imaging sensor 210 is a thermal imaging sensor for sensing infrared radiation 212, the image 142 may be a visible light image of a scene and further image 242 may be a thermal image of the same scene. Consequently, corresponding portions may refer to, e.g., the top row R$_n$ of the image 142 corresponding to the top row R$_m$ of the further image 242, the bottom row R$_0$ of the image 142 corresponding to a same bottom row R$_0$ of the further image 242, etc. This enables the signal processor 260 to, on availability of the subset of pixels 124 and the further subset of pixels 224, combine both subsets of pixels to obtain the processed subset of pixels for, e.g., providing a processed image 262 in which the thermal image is overlaid on top of the visible light image. It is noted that corresponding portions may also refer to, e.g., when the imaging sensor 110 acquires a left-hand view and the further imaging sensor 210 acquires a right-hand view, portions that have a same vertical position in either image.

Figure 8:
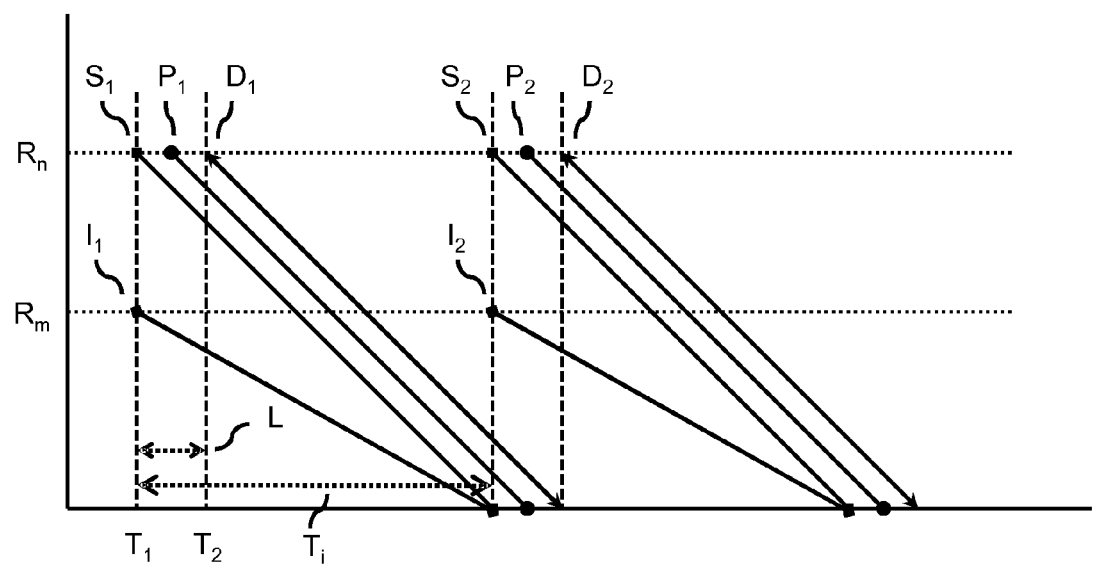
FIG. 8 shows a timing diagram of the imaging device.

In order to compensate for the second spatial resolution being lower than the first spatial resolution, the further rolling shutter circuit 240 is configured for reading out the further image 242 with a second readout speed that is lower than a first readout speed of the rolling shutter circuit 140. This is shown in FIG. 8, where a similar timing diagram is shown as in FIG. 5, with additionally a time period of a reading I$_i$ of the further image 242 being indicated. It will be appreciated that, with the number of rows R$_m$ of the further image 242 being lower than the number of rows R$_n$ of the image 142, the second readout speed needs to be lower to enable the reading I$_1$ of the further image 242 within a same time interval as the reading S$_1$ of the image 142. This is reflected in a lower slope of the reading I$_1$ with respect to a horizontal axis when compared to the reading S$_1$.

FIG. 8 shows the first readout speed being selected for reading S$_1$ the image 142 within an imaging frame time T$_i$ and the second readout speed being selected for reading I$_1$ the further image 242 within the same imaging frame time T$_i$. The imaging frame time T$_i$ is directly coupled to the imaging frame rate, e.g., is 1/60 s=0.0167 ms with a 60 Hz imaging frame rate. For maximizing an exposure of the radiation sensitive array 120, the first readout speed is selected for reading S$_1$ the image 142 in substantially said imaging frame time T$_i$. Furthermore, the second readout speed is selected for substantially reading I$_1$ the further image 242 within the same imaging frame time T$_i$. It will be appreciated that the resulting ratio between the first readout speed and the second readout speed inherently follows from the aforementioned configuration of the imaging device 200 for synchronously reading out corresponding portions of the image 142 and the further image 242.

Moreover, in the example depicted in FIG. 8, the first readout speed and the second readout speed are selected for providing a reading S$_1$ of the image 142 and a reading I$_1$ of the further image 242 that covers the entire imaging frame time T$_i$. This may follow out of a preference for the aforementioned maximizing of an exposure time of the radiation sensitive array 120 and/or of the further radiation sensitive array 220. However, the reading S$_1$ and the reading I$_1$ may also be faster, e.g., being completed before an end of the imaging frame time T$_i$. This reduces the time difference between the reading S$_1$ of the top and bottom part of the image 142, and thus may reduce or avoid so-termed skew artefacts in the image 142. These artefacts are known to occur when said time difference is relatively large. Also, the imaging device 200 may be configured for establishing the first readout speed in dependence on an amount of radiation 112 impinging on the radiation sensitive array 120. As such, the imaging device 200 may dynamically determine a compromise between a needed exposure time and the aforementioned skew effects.

The rolling shutter circuit 140 may be clocked at a first pixel clock for providing the first readout speed and the further rolling shutter circuit 240 may be clocked at a second pixel clock for providing the second readout speed. Since the second readout speed is lower than the first readout speed, the second pixel clock is also lower than the first pixel clock. For example, when the second spatial resolution of the further image 242 is horizontally and vertically one fourth of that of the first spatial resolution of the image 142, e.g., 320 by 256 pixels with respect to 1280 by 1024 pixels, the first readout circuit 140 may be clocked at a system clock of, e.g., 44 MHz, whereas the second readout circuit 240 may be clocked at one sixteenth of that system clock, i.e., a 2.75 MHz pixel clock. Since a lower clock rate typically results in lower power consumption, the power consumption of the imaging device 200 may be reduced. Alternatively, the second readout circuit 240 may be clocked at 44 MHz as well, but may be configured to, on average, only provide one pixel every sixteenth clock cycle.

Figure 9:
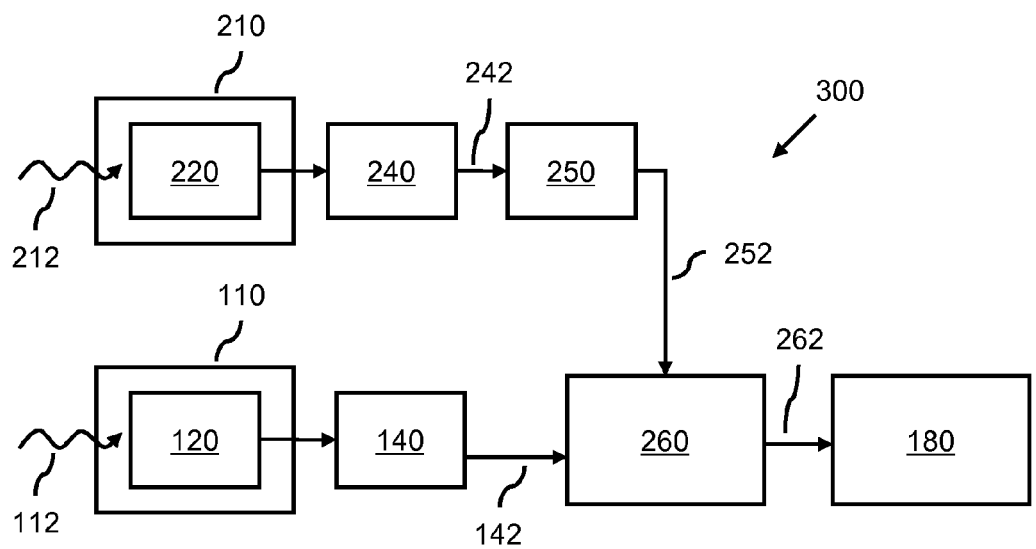
FIG. 9 shows an imaging device comprising a scaler.

Since the second spatial resolution is lower than the first spatial resolution, it may be needed to scale the further image 242 to the first spatial resolution or to a spatial resolution of the display 180. It is noted that this may not be needed in all cases, e.g., when the further image 242 is inserted as a so-termed Picture-in-Picture (PiP) into the image 142. FIG. 9 shows an imaging device 300 comprising a scaler 250 for providing as the further image 242 a scaled image 252 having the first spatial resolution. Here, the further rolling shutter circuit 240 is shown to be connected to the scaler 250 for providing the further image 242 to the scaler 250, and the scaler 250 is shown to be connected to the signal processor 260 for providing the scaled image 252 to the signal processor 260. The scaler 250 may comprise line buffer memories for enabling spatial scaling in a vertical direction. The spatial scaling may comprise performing a zero order linear interpolation technique, i.e., a so-termed pixel repetition or nearest neighbour interpolation, as is known from the technical field of image processing. The spatial scaling may also comprise techniques such as first order linear interpolation, e.g., bilinear interpolation, higher order linear interpolation and non-linear interpolation techniques. Such techniques typically introduce fewer interpolation artefacts.

Figure 10:
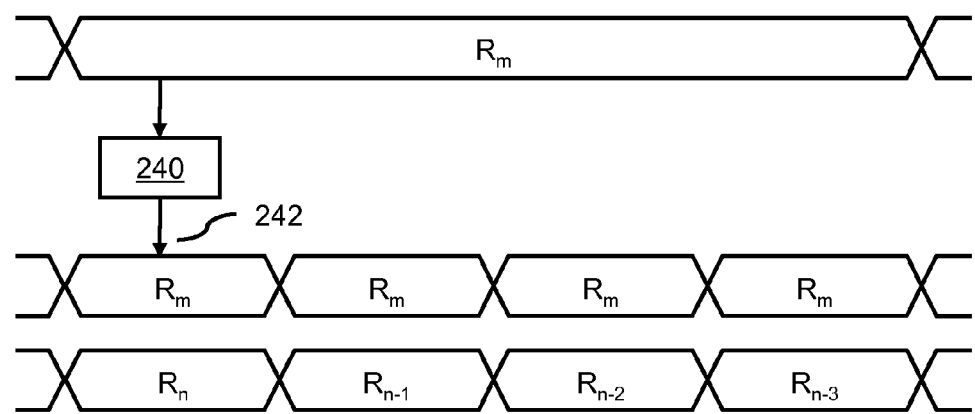
FIG. 10 shows a schematic functioning of a readout circuit.

It is noted that the imaging device 300 does not need to comprise an explicit scaler 250. Instead, a buffer may be used that effectively functions as a scaler. For example, the further rolling shutter circuit 240 may comprise a so-termed First-In-First-Out (FIFO) buffer, as is known from the technical field of processor design and architectures. The further rolling shutter circuit 240 may then read a row $R_m$, as is shown schematically in FIG. 10, from the further radiation sensitive array 220. The reading may be performed using a 2.75 MHz pixel clock. The read out row $R_m$ may then be buffered in the FIFO, and read out with a higher pixel clock, e.g., a 44 MHz pixel clock, for providing the row $R_m$ repeatedly at a same readout speed as the row $R_n$ that is read out by the rolling shutter circuit 140. It is noted that such use of a FIFO buffer effectively performs a nearest neighbour interpolation, although it may conventionally not considered being a scaler. Also, it will be appreciated that such functionality may be also implemented in the signal processor 260 itself, i.e., the signal processor 260 may comprise the FIFO for performing said buffering.

Figure 11:
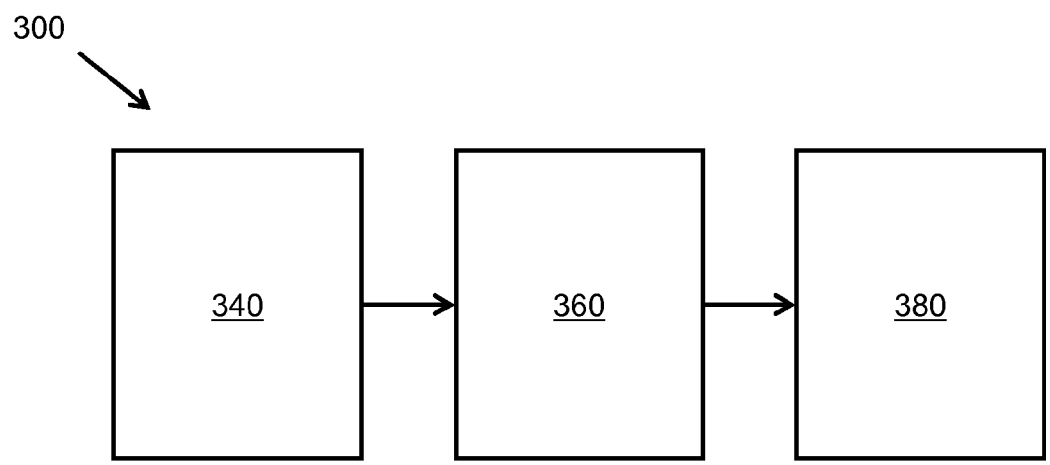
FIG. 11 shows a method for acquiring and displaying images in real-time.

FIG. 11 shows a method 300 of acquiring and displaying images in real-time with an imaging device, the imaging device comprising i) an imaging sensor comprising a radiation sensitive array for acquiring an image, ii) a readout circuit connected to the radiation sensitive array for reading out the image, iii) a signal processor for processing the image for obtaining a processed image, and iv) a display for displaying the processed image, the radiation sensitive array being arranged in rows of sensor pixels and the display being arranged in rows of display pixels, and wherein the method comprises sequentially reading 340 out the rows of sensor pixels with the readout circuit for sequentially providing a subset of pixels, on availability of the subset of pixels, processing 360 the subset of pixels with the signal processor for providing a processed subset of pixels, and on availability of the processed subset of pixels, displaying 380 the processed subset of pixels with the display on a thereto corresponding subset of display pixels for displaying the processed image sequentially on the rows of display pixels.

Figure 12:
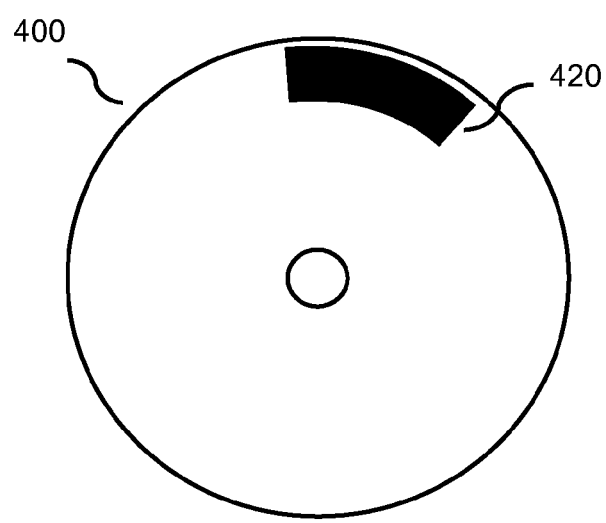
FIG. 12 shows a computer program stored on a computer-readable medium.

FIG. 12 shows a computer readable medium 400 comprising a computer program 420, the computer program 420 comprising instructions for causing a processor system to perform the method 300 as shown in FIG. 11. The computer program 420 may be embodied on the computer readable medium 400 as physical marks or by means of magnetization of the computer readable medium 400. However, any other suitable embodiment is conceivable as well. Furthermore, it will be appreciated that, although the computer readable medium 400 is shown in FIG. 12 as an optical disc, the computer readable medium 400 may be any suitable computer readable medium, such as a read-only-memory or random-access memory, e.g., solid state memory, flash memory, etc.

It will be appreciated that the present invention may be used for various kinds of imaging sensors, and thus is not limited to, e.g., visible light imaging sensors or thermal sensors. Moreover, combining the image 142 with the further image 242 may comprise fusing the image 142 with the further image 242 by, e.g., overlaying certain elements of the further image 242 on top of the image 142. However, the combining may also comprise creating a processed image 262 that comprises a side-by-side, picture-in-picture or similar spatial arrangement of the image 142 and the further image 242.

The signal processor 160 may employ various kinds of signal processing next to the aforementioned combining of fusing of the image 142 and the further image 242. For example, the signal processor 160 may perform various kinds of image processing, as are known from the technical field of image processing, such as non-uniformity correction, histogram equalization, noise reduction, sharpening, colour mapping, etc. Moreover, to increase a throughput of the signal processor 160, the signal processing may comprise an image processing pipeline for obtaining a pipelined processing of the subset of pixels 124.

The display 180 may be a micro Organic Light Emitting Diode (OLED) or Liquid Crystal (LC) based display. The imaging sensor 110 may be a CMOS sensor. The signal processor 160 may be embodied in a FPGA. The imaging sensor 160 may be configured for providing synchronization information, e.g., so-termed horizontal and vertical SYNC signals. These may be used by the imaging device 100 to synchronize the reading, the processing and the displaying of the image 142. The synchronization information may also be used for synchronizing reading the further image 242 using the further readout circuit 240.

It will be appreciated that the above description for clarity has described embodiments of the invention with reference to different functional units. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A night vision device arranged for acquiring and displaying images in real-time, the night vision device comprising:
   i) an imaging sensor comprising a radiation sensitive array for acquiring an image,
   ii) a readout circuit connected to the radiation sensitive array for reading out the image,
   iii) a signal processor for processing the image for obtaining a processed image, and
   iv) a display for displaying the processed image, the radiation sensitive array being arranged in rows of sensor pixels and the display being arranged in rows of display pixels, and wherein:
   the readout circuit is a rolling shutter circuit for sequentially reading out the rows of sensor pixels by a) initializing an exposure of a row, and b) reading out its contents after said exposure, for sequentially providing subsets of pixels), each subset of pixels corresponding to one row or a subset of the rows of sensor pixels or a subset of pixels from a single row;
   the signal processor is configured for, on availability of one of the subsets of pixels, processing the subset of pixels for providing a processed subset of pixels; and
   the display is configured for, on availability of the processed subset of pixels, displaying the processed subset of pixels on a thereto corresponding subset of display pixels for displaying the processed image sequentially on the rows of display pixels, and wherein
   the direct view system comprises a further imaging sensor and a further readout circuit, the further imaging sensor comprising a further radiation sensitive array for acquiring a further image, the further readout circuit being connected to the further radiation sensitive array for reading out the further image, the further radiation sensitive array being arranged in rows of further sensor pixels, the further readout circuit being a further rolling shutter circuit for sequentially reading out the rows of further sensor pixels for sequentially providing further subsets of pixels, and wherein the direct view system is configured for synchronously displaying the image and the further image on the display by:
   (1) the rolling shutter circuit and the further rolling shutter circuit being configured for synchronously providing the subset of pixels and one of the further subsets of pixels by substantially synchronously reading out corresponding portions of the image and the further image; and
   (2) the signal processor being configured for, on availability of the subset of pixels and the further subset of pixels, combining the subset of pixels with the further subset of pixels for obtaining the processed subset of pixels, wherein
   the radiation sensitive array has a first spatial resolution, the further radiation sensitive array has a second spatial resolution, the second spatial resolution being lower than the first spatial resolution and the further rolling shutter circuit being configured for reading out the further image with a second readout speed that is lower than a first readout speed of the rolling shutter circuit for enabling said synchronously providing the subset of pixels and the further subset of pixels, and wherein
   the rolling shutter circuit is clocked at a first pixel clock for providing the first readout speed and the further rolling shutter circuit is clocked at a second pixel clock for providing the second readout speed.

2. The night vision device according to claim 1, wherein the imaging sensor is a visible light imaging sensor for sensing visible light and the further imaging sensor is a thermal imaging sensor for sensing infrared radiation for enabling synchronously displaying a visible light image and a thermal image on the display.

3. The night vision device according to claim 1, wherein the signal processor is configured for combining the subset of pixels with the further subset of pixels by fusing the subset of pixels with the further subset of pixels for obtaining as the processed image an image fusion of the image with the further image.

4. The night vision device according to claim 1, wherein the rolling shutter circuit is configured for reading out the image with the first readout speed within an imaging frame time (Ti), and the further rolling shutter circuit is configured for reading out the further image with the second readout speed within the imaging frame time.

5. The night vision device according to claim 1, wherein the night vision device comprises a scaler for spatially scaling the further subset of pixels for providing as the further image a scaled image having the first spatial resolution.

6. The night vision device according to claim 5, wherein the scaler is configured for performing the spatial scaling using at least one technique out of the group of: pixel repetition, first order linear interpolation, higher order linear interpolation and non-linear interpolation techniques.

7. The night vision device according to claim 1, wherein the signal processor comprises an image processing pipeline for obtaining a pipelined processing of the subsets of pixels.

8. The night vision device according to claim 1, wherein the rolling shutter circuit is configured for reading out the image with a first readout speed, and wherein the night vision device is configured for establishing the first readout speed in dependence on an amount of radiation impinging on the radiation sensitive array.

9. The night vision device according to claim 1, wherein the night vision device comprises an image intensifier for providing intensified visible light to the imaging sensor.

10. A helmet, head mount, rifle sight or handheld device comprising the night vision device according to claim 1.

11. A method of acquiring and displaying images in real-time with a night vision device, the night vision device comprising i) an imaging sensor comprising a radiation sensitive array for acquiring an image, ii) a readout circuit connected to the radiation sensitive array for reading out the image, iii) a signal processor for processing the image for obtaining a processed image, and iv) a display for displaying the processed image, the radiation sensitive array being arranged in rows of sensor pixels and the display being arranged in rows of display pixels, and wherein the method comprises:

sequentially reading out the rows of sensor pixels with the readout circuit by
(a) initializing an exposure of a row, and (b) reading out its contents after said exposure, for sequentially providing subsets of pixels, each subset of pixels corresponding to one row or a subset of the rows of sensor pixels or a subset of pixels from a single row;

on availability of one of the subsets of pixels, processing the subset of pixels with the signal processor for providing a processed subset of pixels; and on availability of the processed subset of pixels, displaying the processed subset of pixels with the display on a thereto corresponding subset of display pixels for displaying the processed image sequentially on the rows of display pixels, wherein the night vision device comprises a further imaging sensor and a further readout circuit, the further imaging sensor comprising a further radiation sensitive array for acquiring a further image, the further readout circuit being connected to the further radiation sensitive array for reading out the further image, the further radiation sensitive array being arranged in rows of further sensor pixels, the further readout circuit being a further rolling shutter circuit for sequentially reading out the rows of further sensor pixels for sequentially providing further subsets of pixels, and wherein the method comprises synchronously displaying the image and the further image on the display by:

synchronously providing the subset of pixels and one of the further subsets of pixels by substantially synchronously reading out corresponding portions of the image and the further image; and on availability of the subset of pixels and the further subset of pixels, combining the subset of pixels with the further subset of pixels for obtaining the processed subset of pixels, wherein the radiation sensitive array has a first spatial resolution, the further radiation sensitive array has a second spatial resolution, the second spatial resolution being lower than the first spatial resolution and the method further comprising reading out the further image with a second readout speed that is lower than a first readout speed of the rolling shutter circuit for enabling said synchronously providing the subset of pixels and the further subset of pixels, wherein method comprises clocking the rolling shutter circuit at a first pixel clock for providing the first readout speed and clocking the further rolling shutter circuit at a second pixel clock for providing the second readout speed.

12. A computer program stored on a non-transitory computer-readable medium, the computer program comprising instructions for causing a processor system to perform the method according to claim 11.

* * * * *